United States Patent
Fletcher et al.

[15] 3,699,511
[45] Oct. 17, 1972

[54] DISPLAY RESEARCH COLLISION WARNING SYSTEM

[72] Inventors: James C. Fletcher, Administrator of the National Aeronautics and Space Administration, with respect to an invention of; Renwick E. Curry, 53 Tower Road, Hingham, Mass. 02043; Laurence R. Young, 141 Grant Avenue, Newton, Mass. 02159; Thomas Basil Smith, III, 1406 Westgate Apartment, M. I. T., Cambridge, Mass. 02139; John Rawson, 360 Emerson Road, Hatfield, Hingham, Mass. 02173

[22] Filed: June 25, 1971

[21] Appl. No.: 156,724

[52] U.S. Cl. ..................340/27 NA, 340/33, 340/97, 343/112 CA
[51] Int. Cl. ..............................................G08g 5/00
[58] Field of Search ........73/178 R; 240/7.7; 340/1 T, 340/16 R, 27 NA, 31 R, 33, 34, 97; 343/112 CA

[56] References Cited

UNITED STATES PATENTS 2,560,265  7/1951  Adler.................343/112 CA
3,052,882  9/1962  Pidhayny............343/112 CA
3,321,758  5/1967  Elliot...................343/112 CA

OTHER PUBLICATIONS

Aviation Week Magazine Sept. 26, 1952, " Collins ' Radar Cocoon' to Protect Aircraft," Philip J. Klass, Pp. 37 & 38.

*Primary Examiner*—Ralph D. Blakeslee
*Attorney*—John R. Manning et al.

[57] ABSTRACT

A head-up display for a PWI system is disclosed. The display consists of a plurality of strips of an electroluminescent tape secured above and below the windshield and above side windows of a cockpit. The strips are associated with elevation range and azimuth range sectors which are viewable by the pilot through the windshield or windows, and are located in the directions of these sectors. When a target is detected in any of the sectors by a corresponding detector the strip or strips associated with the particular sector are illuminated. The pilot's peripheral vision is sufficient to notice their illumination thereby enabling him to directly view the particular sector without reference to a display on the instrument panel.

6 Claims, 4 Drawing Figures

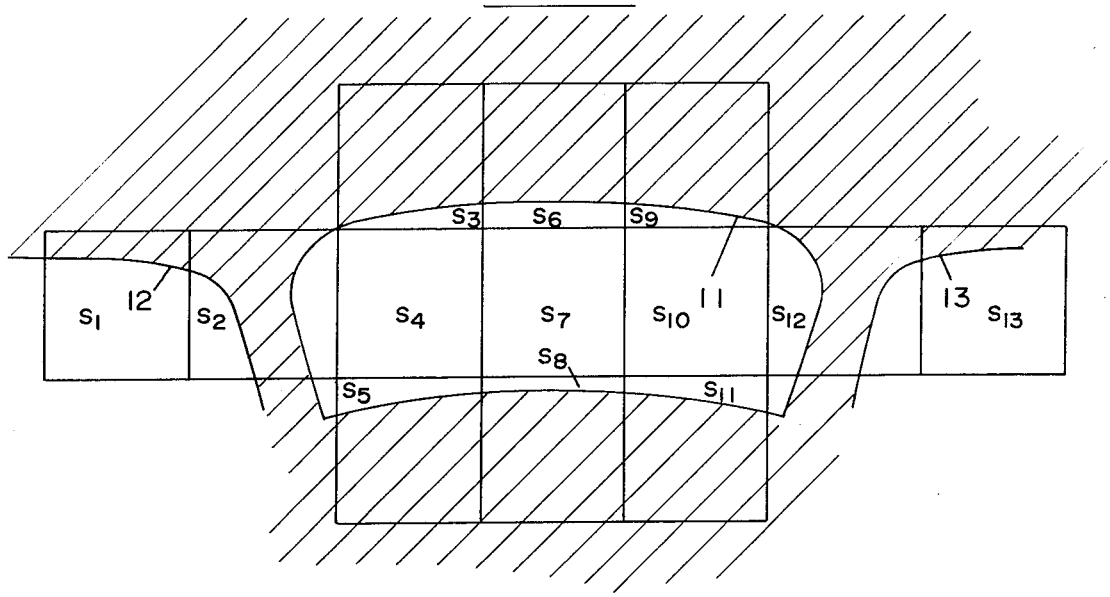
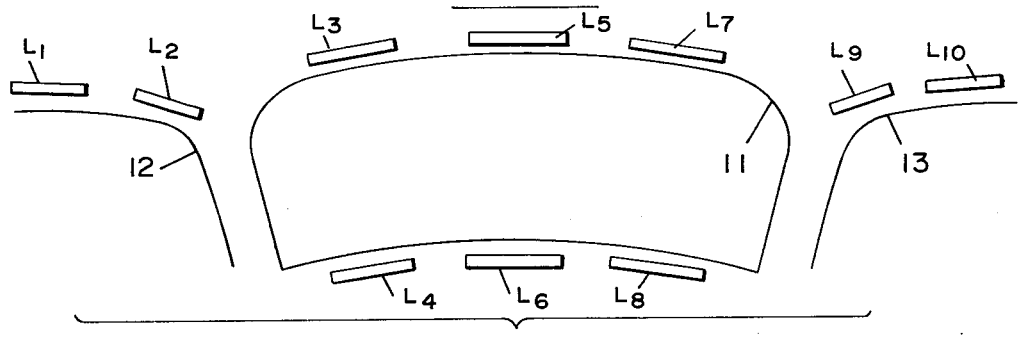
RENWICK E. CURRY
LAWRENCE R YOUNG
THOMAS BASIL SMITH III
JOHN RAWSON HATFIELD
*INVENTORS*
BY
*Monte F. Mott*
ATTORNEYS

DISPLAY RESEARCH COLLISION WARNING SYSTEM

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

The present invention generally relates to airborne instrumentation and, more particularly, to a novel display for use in a pilot warning instrument (PWI) system.

2. Description of the Prior Art

The work load of the pilot of today's traffic environment is increasing, regardless of the polot's rating or the aircraft that he is flying. This is especially true in high density traffic areas where the tasks of maintaining vigilance for other aircraft, performing navigation functions, and following instructions from air traffic controllers create a heavy load on the pilot's ability to fly his aircraft in a safe manner. To prevent mid-air collisions two basic classes of onboard systems have been developed to assist the pilot to locate the positions of nearby airplanes, hereafter referred to as targets. One class of systems is generally known as the PWI system, for pilot warning indicator, or proximity warning indicator. One infrared PWI system uses currently available xenon strobe lights as a transmitting source. The receivers are built around silicon detectors. The detectors are arrayed so as to provide target position information from selected sectors such as those viewable by the pilot through the airplane's front window or windshield and the two side windows. When a target is detected in any of the sectors by one of the detectors, the appropriate detector provides an output which is then communicated to the pilot who has to visually locate the target in the particular sector.

Although a PWI system does not provide target range or target range-rate data, it does provide bearing and elevation information above the target, which has been found to be helpful in locating the target and thereby avoiding mid-air collisions. However, for a PWI system to be effective it is very important that the information output of the system, i.e., the output of any of the detectors, be transmitted to the pilot in a way that enables him to locate the target as soon as possible without ambiguity, and without appreciably impairing his performance in controlling his aircraft. A PWI system is intended primarily for use under VFR conditions, i.e., under conditions in which the pilot's attention is directed primarily outside the cockpit. Thus, for the PWI system to be effective it is necessary to display the output of the system to the pilot without diverting his attention, to a display on the instrument panel. None of the prior art PWI systems displays the information output in such a manner. Therefore, the effectiveness of prior art PWI systems is unnecessarily limited.

OBJECTS AND SUMMARY OF THE INVENTION

It is a primary object of the present invention to provide a new improved PWI system.

It is another object of the present invention to provide an improved display arrangement for the output of a PWI system.

A further object of the present invention is to provide a new improved display unit for use in a PWI system which enables the pilot to observe the system output without diverting his attention when directed mostly to the outside of the cockpit.

These and other objects of the invention are achieved by a head-up PWI display unit consisting of a plurality of elongated light sources which are attached about the windshield and the side windows. When one or more of the light sources is illuminated, in response to the output of one of the detectors, the pilot's peripheral vision enables him to notice their illumination and direct his attention to the sector related to the illuminated light sources, while continuously directing his attention to events outside the cockpit. By incorporating elongate rather than spot light sources the pilot is provided with bearing boundaries of the sector to be searched. Such a novel display enables the pilot to locate an intruding target as soon as possible. It eliminates the disruption of the pilot's attention from events outside of the cockpit as is the case in the prior art which require the pilot to observe a panel inside the cockpit and thereafter redirect his attention to the outside in the direction of the particular sector in which the target has been detected.

The novel features of the invention are the set forth with particularity in the appended claims. The invention will best be understood from the following description when read in conjunction with the accompanying drawings.

BRIEF DESCRIPTION OF THE DRAWINGS

FIG. 1 is a projection of a windshield and side window on an array of viewable sectors;

FIG. 2 is a diagram of detectors arranged in an arrangement corresponding to the sector's array;

FIG. 3 is a diagram of light sources located about the windshield and the side windows.

DESCRIPTION OF THE PREFERRED EMBODIMENTS

Figure 4:
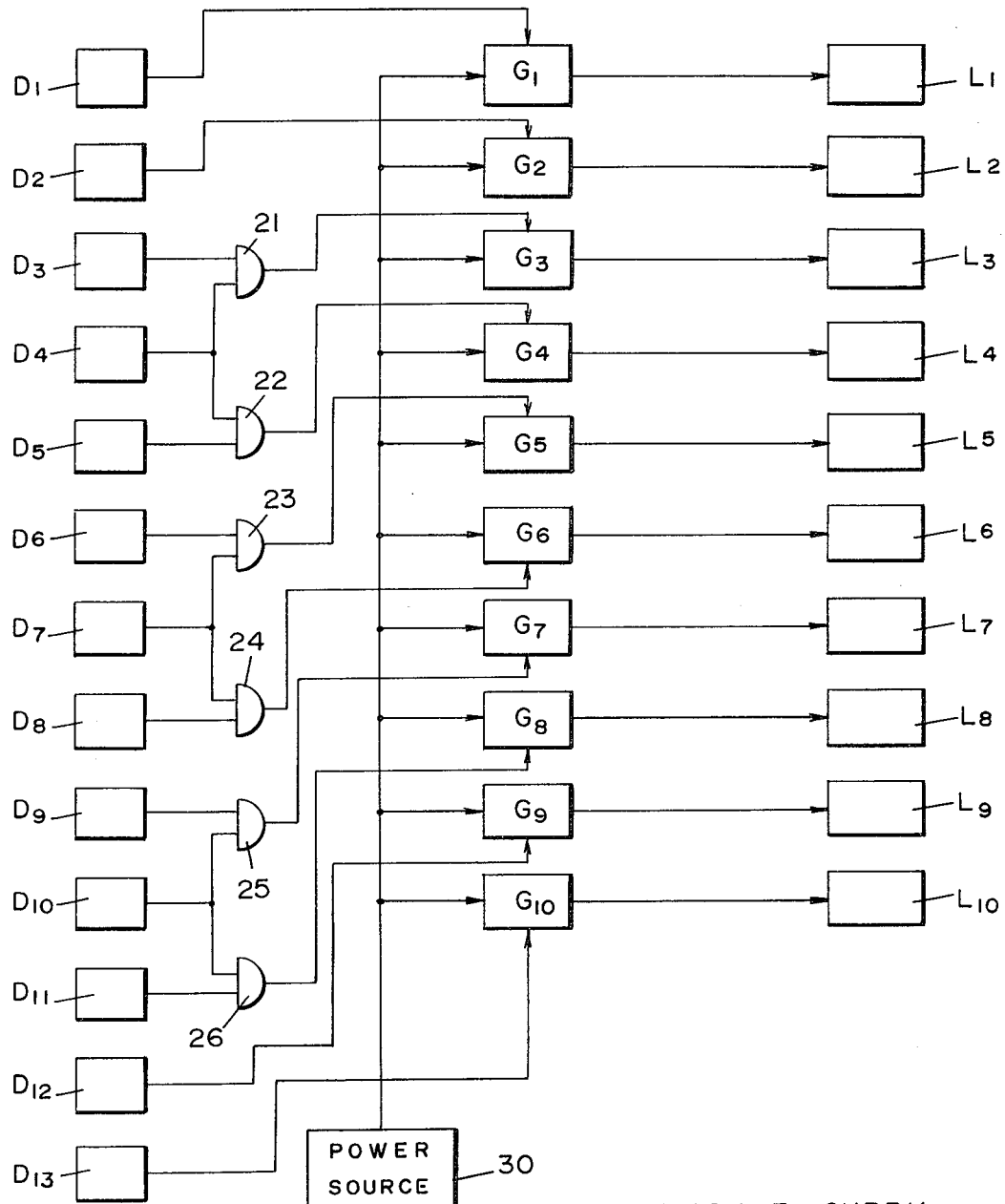
FIG. 4 is a block diagram of circuitry for controlling the energization of the light sources as a function of the outputs of the detectors.

Attention is now directed to FIG. 1 which is a projection of a windshield 11 and side windows 12 and 13 of a cockpit on a plurality of detection sectors $S_1$-$S_{13}$. Sectors $S_1$ and $S_2$ are areas viewable through window 12 while $S_{12}$ and $S_{13}$ are viewable through window 13. The rest of the sectors are viewable through windshield 11. The PWI system includes a plurality of detectors designated $D_1$-$D_{13}$ in FIG. 2. Each detector has a fixed field of view, e.g., 20° × 20°, corresponding to one sector and it provides an output only when it detects a target in its corresponding sector. As seen the detectors are arranged to correspond to the array of the sectors shown in FIG. 1. Thus the combined detector array covers selected azimuth and elevation images about the aircraft's longitudinal axis, which herein is assumed to be perpendicular to FIGS. 1 or 2.

As previously pointed out, the desired display indicating which detector provides an output, i.e., in which sector a target is detected, is one which provides such indication without diverting the pilot's attention from events outside the cockpit. Alternately stated, the display should be one which the pilot can notice while looking out through the windshield or one of the side windows. In accordance with the present invention a head-up display is provided. It consists of a plurality of light sources which are attached about the windshield and the side windows. One or more of these sources are illuminated when a particular detector provides an output as will be explained hereafter. The pilot's peripheral vision, while looking out of the cockpit, is sufficient to notice which light source or sources are illuminated, so that the pilot can immediately visually scan the particular sector in which a target is detected. Such a display arrangement insures that the pilot's attention is not diverted from observing events outside the cockpit while providing him with an indication of the sector in which a target is detected.

In one particular embodiment for an array of detectors as shown in FIG. 2, 10 light sources are employed and are attached about the windshield and the side windows as shown in FIG. 3, wherein the light sources are represented by rectangles $L_1$-$L_{10}$. Sources $L_1$ and $L_2$ are placed about window 12 and $L_9$ and $L_{10}$ about window 13, while $L_1$, $L_5$ and $L_7$ are placed above the windshield −1 and $L_4$, $L_6$ and $L_8$ below it or just above the panel board. Light source $L_1$ which is located in the direction of sector $S_1$ is illuminated wherever a target is detected in $S_1$ causing detector $D_1$ to provide an output. Similarly sources $L_2$-$L_{10}$ are illuminated whenever $D_2$, $D_3$, $D_5$, $D_6$, $D_8$, $D_9$, $D_{11}$, $D_{12}$, and $D_{13}$ provide outputs, respectively. When $D_4$ provides an output, indicating the detection of a target in $S_4$ both $L_3$ and $L_4$ above and below sector $S_4$ are illuminated. Similarly both $L_5$ and $L_6$ are illuminated when a target is detected in sector $S_7$ and $D_7$ provides an output, while $L_7$ and $L_8$ are illuminated when $D_{10}$ provides an output indicating target detection in sector $S_{10}$. It should be appreciated that since the light sources are placed in directions pointing to their corresponding sectors, once the pilot notices which sources are illuminated he knows immediately which sector should be visually scanned, and is able to do so without diverting his attention from observing events occurring outside.

In accordance with the present invention the light sources are elongated, rather than spot sources. Thus, their lengths assist the pilot in determining the bearing boundaries of the sector to be searched. By enabling the pilot to determine the sector's bearing boundaries the search time is greatly reduced thereby enabling the pilot to locate the intruding target. Thus, the novel display provides the desired advantages, discussed herebefore.

It should be apparent that various techniques may be used to control the energization of sources $L_1$-$L_{10}$ from an appropriate power source as a function of the outputs of detectors $D_1$-$D_{13}$. One simple arrangement is shown in FIG. 4 in which the power source is designated by numeral 20. Its output is shown connected to $L_1$-$L_{10}$ through gates $G_1$-$G_{10}$ respectively. Gates $G_1$, $G_2$, $G_9$ and $G_{10}$ are opened or enabled by the direct outputs of $D_1$, $D_2$, $D_{12}$ and $D_{13}$ respectively, while gates $G_3$-$G_8$ are opened or enabled by the outputs of two-input OR gates 21-26. These gates are needed to insure proper energization of the sources $L_3$-$L_8$, located above and below the windshield as a function of the front sector in which a target is detected.

It is generally desirable to use sources whose brightness can be adjusted as a function of the light intensity in the cockpit. In one embodiment strips of a commercially available electroluminescent tape are used as the light sources. Such tape, which has to be energized by an AC source, uses very little power. Another advantage of such tape is that its brightness can be varied as a function of source frequency or voltage. Thus by varying the frequency or voltage, the brightness can be adjusted as a function of cockpit light intensity. In the particular embodiment strips of Sylvania green Panelescent Tape-Lite were used. The brightness of this particular tape varries from 5 foot-lamberts at 120 V 60 Hz to 30 foot-lamberts at 120 V 40 Hz. Its power requirement is approximately 0.3 watts per foot at 120 V, 60 Hz. This particular tape is described as one example. It is apparent that other elongated means may be used as the elongated light sources, e.g., liquid crystals. Such means may be preferrable under bright sky conditions if the strips are found to provide insufficient brightness.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. For use with a system in an airborne airplane which includes an array of detectors for detecting targets located in azimuth and elevation ranges with respect to said airplane, said ranges defining an array of sectors corresponding to the array of said detectors with each detector providing an output when a target is detected by it in a sector which is within its field of view, said sectors being viewable by a pilot from the cockpit, having at least one window-like opening, a display comprising:

a plurality of elongated light sources each associated with at least one sector and secured adjacent said opening in the direction of the sector with which it is associated with the length of the source defining the bearing boundaries of the source with which the light source is associated; and means for illuminating at least one of said light sources when a target is detected in the sector with which it is associated.

2. The arrangement as recited in claim 1 wherein said airplane includes a front window through which are viewable at least two sectors each defining two different elevation ranges, with at least one of said light sources being secured above said front window and one of said light sources being secured below said front window.

3. The arrangement as recited in claim 1 wherein said airplane includes a front window through which are viewable first, second and third sectors defining the same azimuth range and a first lower elevation range, a second middle elevation range and a third upper elevation range, a first light source secured to the top of said front window and a second light source secured below said front window at an azimuth corresponding to the sectors' azimuth range, said means energizing said first light source when a target is detected in either said second and third sectors and energizing said second light source when a target is detected in either said first or said second sector.

4. In combination with a system in an airborne airplane which includes at least an array of detectors with a combined field of view covering selected azimuth and elevation ranges, the field being divisable into contiguous sectors viewable from the front window of the airplane's cockpit with each detector being associated with a different sector and providing an output when a target is detected in the sector associated therewith, a display comprising:
  a plurality of energizable light sources secured above and below said front window, each associated with at least one of said sectors and secured about said window at an elevation and azimuth corresponding to the sector's elevation and azimuth ranges within said field of view; and
  control means for utilizing the outputs of said detectors to energize the light sources which are associated with the sectors from which targets are detected.

5. The arrangement as recited in claim 4 wherein said control means include means for varying the brightness of the energized light sources.

6. The arrangement as recited in claim 4 wherein said array includes at least first, second, third and fourth detectors arranged in a 2×2 array, respectively, responsive to targets detected in first, second, third and fourth sectors of said field of view, the first, second, third and fourth sectors defining upper left, lower left, upper right and lower right quadrants of said field of view, and said display includes first, second, third and fourth light sources, with said first and second light sources being secured above and below the left side of said window and said third and fourth light sources being secured above and below the right side of said window, and said control means utilize the outputs of said detectors to energize the light source whose location relative to said window is in the direction of the sector in which a target is detected.

* * * * *